United States Patent
Tsukamoto et al.

[11] Patent Number: 5,991,706
[45] Date of Patent: Nov. 23, 1999

[54] ELECTRONIC MEASURING APPARATUS

[75] Inventors: Shinji Tsukamoto; Atsumi Kaneko, both of Tokyo, Japan

[73] Assignee: Asahi Kogaku Kogyo Kabushiki Kaisha, Tokyo, Japan

[21] Appl. No.: 08/812,863

[22] Filed: Mar. 6, 1997

[30]     Foreign Application Priority Data

Mar. 11, 1996   [JP]   Japan ................................ 8-053539
Dec. 13, 1996   [JP]   Japan ................................ 8-334126

[51] Int. Cl.$^6$ ............................................... G01C 1/02
[52] U.S. Cl. ........................... 702/182; 702/155; 33/1 T; 33/281
[58] Field of Search ................................. 364/579, 550, 364/561, 57, 562, 705.01, 1 T, 528.14; 33/281, 284, 285; 702/182, 155

[56]             References Cited

U.S. PATENT DOCUMENTS 5,519,642   5/1996   Kishimoto ............................... 364/561
5,650,949   7/1997   Kishimoto et al. ...................... 364/579

*Primary Examiner*—Kamini Shah
*Attorney, Agent, or Firm*—Greenblum & Bernstein, P.L.C.

[57]           ABSTRACT

An electronic measuring apparatus having a plurality of measuring modes. Each one of the plurality of measuring modes is selectively set to perform a corresponding operation. The electronic measuring apparatus includes a plurality of operational buttons. Information which associates one of the plurality of operational buttons with one of the plurality of measuring modes is stored in a memory. It is then distinguished which one of the plurality of operational buttons has been operated. Information stored in the memory, which associates the distinguished one of the plurality of operational buttons with the one of the plurality of measuring modes is searched and an operation unique to the one of the plurality of measuring modes which is associated with the distinguished one of the plurality of operational buttons is performed. Electrical power is supplied to the searching and performing means, wherein the supplying means starts supplying electrical power to certain portions of the electronic measuring apparatus when it is distinguished that one of the plurality of operational buttons has been manipulated. Further, the searching and performing operation occurs upon receiving the electrical power. Finally, the stored information is renewed in the memory.

37 Claims, 13 Drawing Sheets

Fig.5

Measuring Mode Information for Shot Measuring Mode

| Image indicated on Indication Panel 12 | 1. Shot Measurement<br><br>next OK |
|---|---|
| Command for F1 Function Button | — |
| Command for F2 Function Button | — |
| Command for F3 Function Button | — |
| Command for F4 Function Button | Stake Out Measuring Mode Selecting Command |
| Command for F5 Function Button | Shot Measuring Mode Confirming Command |
| Head Address of Program | ×××××  |

Fig.6

Data Table

| Function Button Number | 3 |
|---|---|
| Measuring Mode | Shot Measuring Mode |

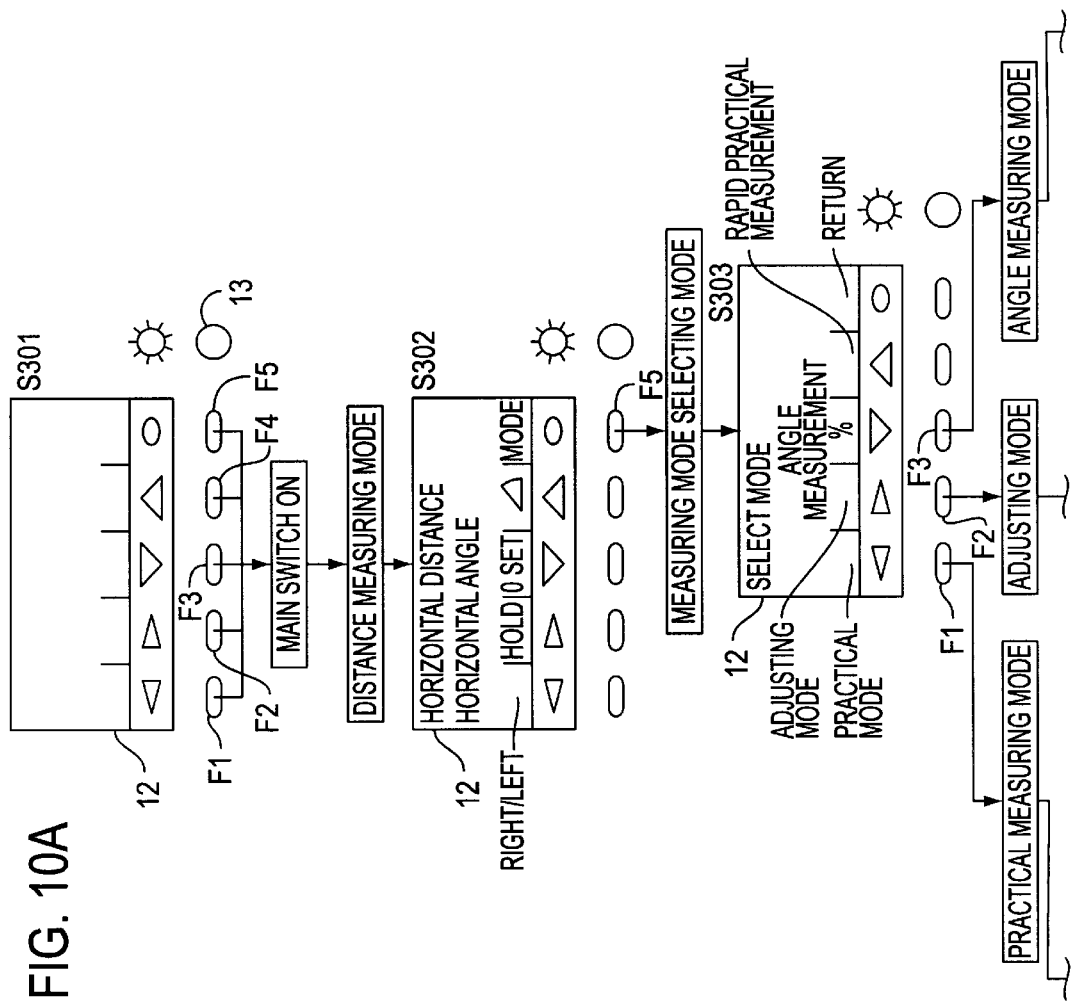

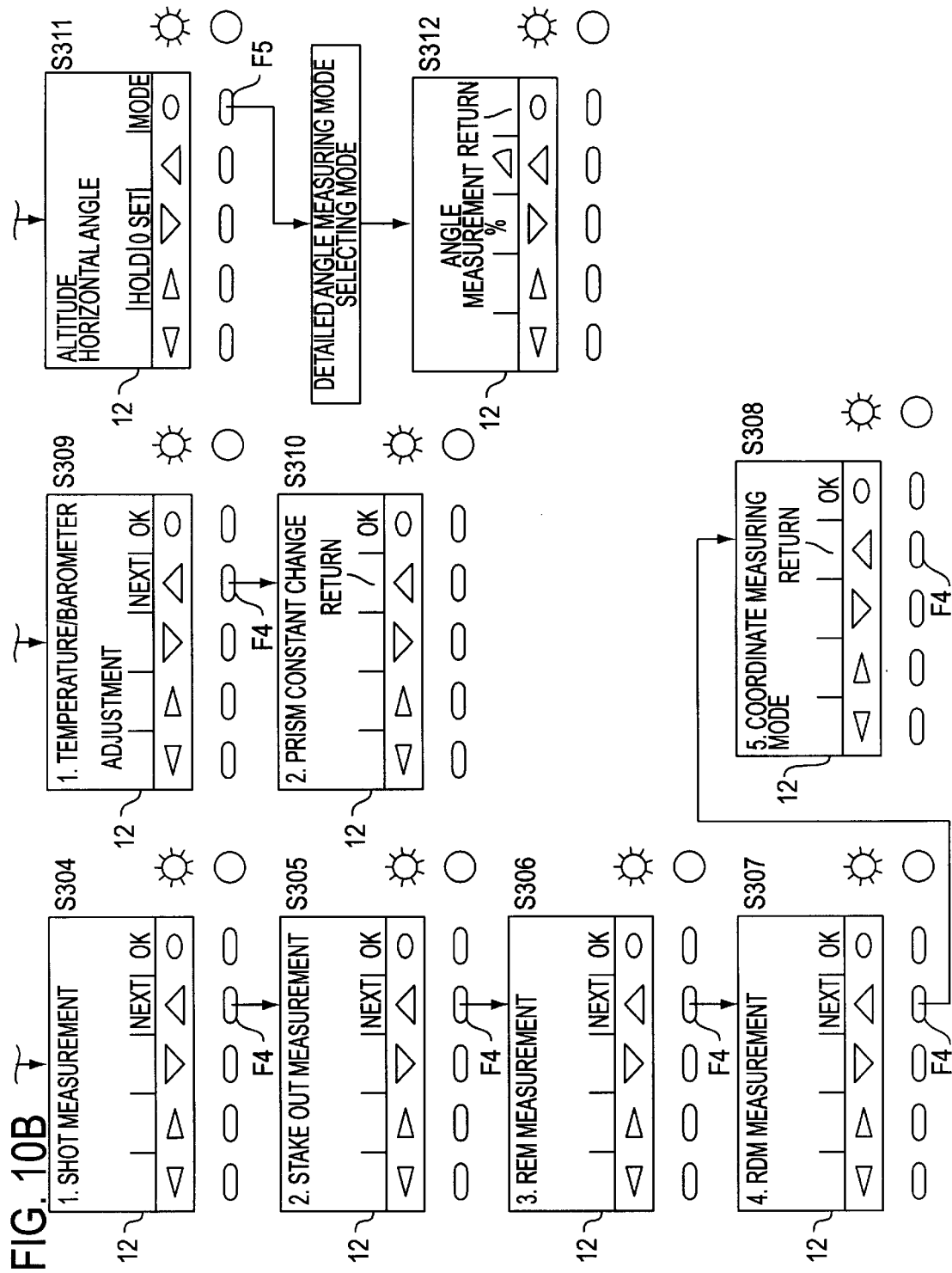

ELECTRONIC MEASURING APPARATUS

BACKGROUND OF THE INVENTION

1. Field of the Invention

The present invention relates to an electronic measuring apparatus having a plurality of modes used for measurement. Any one of the modes can be freely selected to be set by an operator.

2. Description of the Related Art

As regards conventional electronic measuring apparatus, an electronic theodolite (ETH) serving as an angle measuring apparatus, an electronic distance meter (EDM) serving as a distance meter, a total station which generally has the functions of both the electronic theodolite and the electronic distance meter, and the like, are well known in the field of surveying. Each of these conventional electronic measuring apparatus usually has various programs (for example, control program, measuring program, etc.) which can be selectively carried out. By selecting one or more programs, various operations can be performed. Such operations include an operation by which parameters of a condition of measurement (temperature, barometer, etc.) can be set, operations by which various types of measurement (distance measurement, angle measurement, etc.) can be carried out, and an operation by which a practical measurement can be carried out in which the results of the various types of measurement are data-processed to obtain two-dimensional information. These various operations are carried out under the respective measuring modes of the electronic measuring apparatus. In other words, when one of the measuring modes is selected, a corresponding one of the various operations is performed.

FIG. 13 shows an operational panel 100 provided on a conventional electronic measuring apparatus that is operated by an operator to manually select a desired measuring mode from a plurality of measuring modes of the conventional electronic measuring apparatus.

The operational panel 100 is provided thereon with an LCD indication panel 80 on which various information, including information of a presently-set measuring mode, is visually indicated. The operational panel 100 is further provided thereon with a plurality of operational buttons, i.e., seven operational buttons F1, F2, F3, F4, F5, LSW and MSW. The buttons F1, F2, F3, F4 and F5 are mode selecting buttons (select buttons) to select respective measuring modes of the electronic measuring apparatus. The button LSW is an illumination light ON/OFF switch button. The LCD indication panel 80 is illuminated when the button LSW is depressed. The button MSW is a power switch of the electronic measuring apparatus. As can be seen from FIG. 13, the power switch MSW is provided separately from the mode selecting buttons F1, F2, F3, F4 and F5.

In the case where the power switch of an electronic measuring apparatus is provided separately from any of the mode selecting buttons of the electronic measuring apparatus, as in the case shown in FIG. 13, in order to actuate the electronic measuring apparatus, the operator inevitably has to operate or depress one or more operational button at least twice, i.e., the power switch has to be firstly depressed to turn it ON, and thereafter at least one of the mode selecting buttons has to be depressed to select a desired measuring mode.

In the case where the number of measuring modes of the electronic measuring apparatus exceeds the number of mode selecting buttons (e.g., the aforementioned mode selecting buttons F1, F2, F3, F4 and F5) provided on the apparatus, after having turned the power switch ON, the operator has to operate one or more of the mode selecting buttons at least twice. That is, for instance, after having turned the power switch ON, the operator needs to depress one of the mode selecting buttons to select a corresponding group of measuring modes and subsequently further depress one of the mode selecting buttons to select a desired measuring mode from the selected corresponding group of measuring modes.

SUMMARY OF THE INVENTION

The primary object of the present invention is to provide an electronic measuring apparatus which makes it possible for an operator to easily select a desired measuring mode from a plurality of measuring modes by a simple operation.

To achieve the object mentioned above, according to an aspect of the present invention, there is provided an electronic measuring apparatus having a plurality of measuring modes, each one of the plurality of measuring modes being selectively set to perform a corresponding operation. The electronic measuring apparatus includes a plurality of operational buttons; means for storing information which associates one of the plurality of operational buttons with one of the plurality of measuring modes; means for distinguishing which one of the plurality of operational buttons has been operated; means for searching information, stored in the storing means, which associates the distinguished one of the plurality of operational buttons with the one of the plurality of measuring modes and for performing an operation unique to the one of the plurality of measuring modes which is associated with the distinguished one of the plurality of operational buttons; means for supplying electrical power to the searching and performing means, wherein the supplying means starts supplying electrical power to the searching and performing means when the distinguishing means distinguishes the one of the plurality of operational buttons, and further wherein the searching and performing means starts performing the operation upon receiving the electrical power from the supplying means; and means for renewing the stored information in the storing means. With this structure, an operation unique to one of the plurality of measuring modes starts to be performed immediately after one of the plurality of operational buttons which is associated with the one of the plurality of measuring modes is operated. Therefore, an operator does not have to operate one or more operational buttons more than once to set a desired measuring mode, unlike a conventional electronic measuring apparatus.

Preferably, the distinguishing means includes means for monitoring each of the plurality of operational buttons to detect if there is a change in condition in the plurality of operational buttons, wherein the supplying means supplies electrical power when the monitoring means detects the change in condition in the plurality of operational buttons.

To achieve the object mentioned above, according to yet another aspect of the present invention, there is provided an electronic measuring apparatus having a plurality of measuring modes, each one of the plurality of measuring modes being selectively set to perform a corresponding operation. The electronic measuring apparatus includes a plurality of operational buttons; means for distinguishing which one of the plurality of operational buttons has been operated; means for setting a current measuring mode from one of the plurality of measuring modes and for performing an operation unique to the current measuring mode; means for supplying electrical power to the setting and performing means, wherein the supplying means starts supplying electrical power to the setting and performing means when the distinguishing means distinguishes the one of the plurality of operational buttons, and further wherein the setting and performing means starts performing the operation upon receiving the electrical power from the supplying means; means for visually indicating an indication which shows a relationship between at least one of the plurality of operational buttons in one of the plurality of measuring modes which has been set by the setting means, and another one of the plurality of measuring modes; means for storing information which associates one of the plurality of operational buttons with one of the plurality of measuring modes; measuring mode setting means for firstly searching the stored information in the storing means and subsequently for controlling the setting and performing means to set the current measuring mode, immediately after the setting and performing means starts performing the operation, and thereafter, for controlling the setting and performing means to set a second one of the plurality of measuring modes when one of the plurality of buttons, which is associated with the second one of the plurality of measuring modes by the information visually indicated by the indicating means, is operated; and means for renewing the stored information in the storing means.

To achieve the object mentioned above, according to yet another aspect of the present invention, there is provided an electronic measuring apparatus having a plurality of measuring modes, each one of the plurality of measuring modes being selectively set to perform a corresponding operation. The electronic measuring apparatus includes a plurality of operational buttons; means for distinguishing which one of the plurality of operational buttons has been operated; means for setting a current measuring mode from one of the plurality of measuring modes and for performing an operation unique to the current measuring mode; means for supplying electrical power to the setting and performing means, wherein the supplying means starts supplying the electrical power to the setting and performing means when the distinguishing means distinguishes the one of the plurality of operational buttons, and further wherein the setting and performing means starts performing the operation upon receiving the electrical power from the supplying means; means for visually selectively indicating each one of a plurality of indications each showing a relationship between at least one of the plurality of operational buttons in one of the plurality of measuring modes which has been set by the setting means, and a command to change a presently-indicated one of the plurality of indications to another one of the plurality of indications; means for storing information which associates one of the plurality of operational buttons with one of the plurality of indications; an indication controller for firstly searching the stored information in the storing means and for subsequently controlling the indicating means to indicate the one of the plurality of indications, immediately after the setting and performing means starts performing the operation, and thereafter, for controlling the indicating means to indicate a second one of the plurality of indications when one of the plurality of buttons which is associated with the changing command is operated; and means for renewing the stored information in the storing means.

To achieve the object mentioned above, according to yet another aspect of the present invention, there is provided an electronic measuring apparatus having a plurality of programs, each one of the plurality of programs being selectively performed to carry out a corresponding operation. The electronic measuring apparatus includes: a medium in which the plurality of programs are stored; a plurality of operational buttons, at least one of the plurality of operational buttons associating with a corresponding one of the plurality of programs; means for distinguishing which one of the plurality of operational buttons has been operated; means for performing a program unique to that one of the plurality of programs which corresponds to the distinguished one of the plurality of operational buttons; and means for supplying electrical power to the performing means, wherein the supplying means starts supplying the electrical power to the performing means when the distinguishing means distinguishes the one of the plurality of operational buttons, and further wherein the performing means starts performing the operation upon receiving the electrical power from the supplying means.

The present disclosure relates to subject matter contained in Japanese Patent Applications No. HEI 8-53539 (filed on Mar. 11, 1996) and No. HEI 8-334126 (filed on Dec. 13, 1996) which are expressly incorporated herein by reference in their entireties.

BRIEF DESCRIPTION OF THE DRAWINGS

The invention will be described below in detail with reference to the accompanying drawings, in which:

FIG. 5 is a table which illustrates measuring mode information for a shot measuring mode;

FIG. 6 is a table which illustrates a data table for associating one of the mode selecting buttons with any one of the plurality of measuring modes;

FIGS. 10A and 10B are a flow chart which illustrates the transition of the message indicated on the indication panel under the condition that no data table has been stored in an EEPROM shown in FIG. 7;

DESCRIPTION OF THE PREFERRED EMBODIMENT

Figure 1:
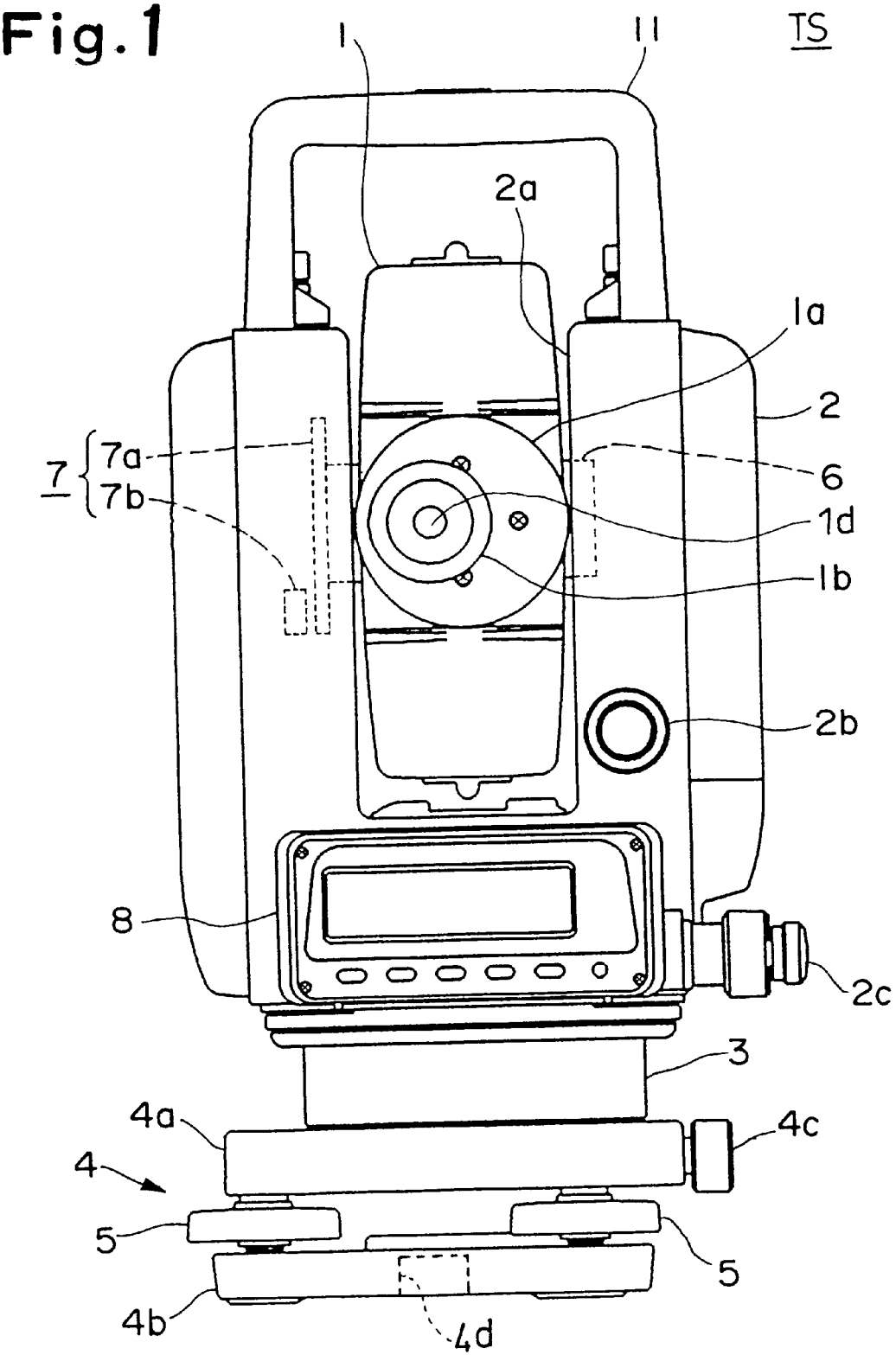
FIG. 1 is a rear elevational view of an embodiment of a total station to which the present invention is applied.
Figure 2:
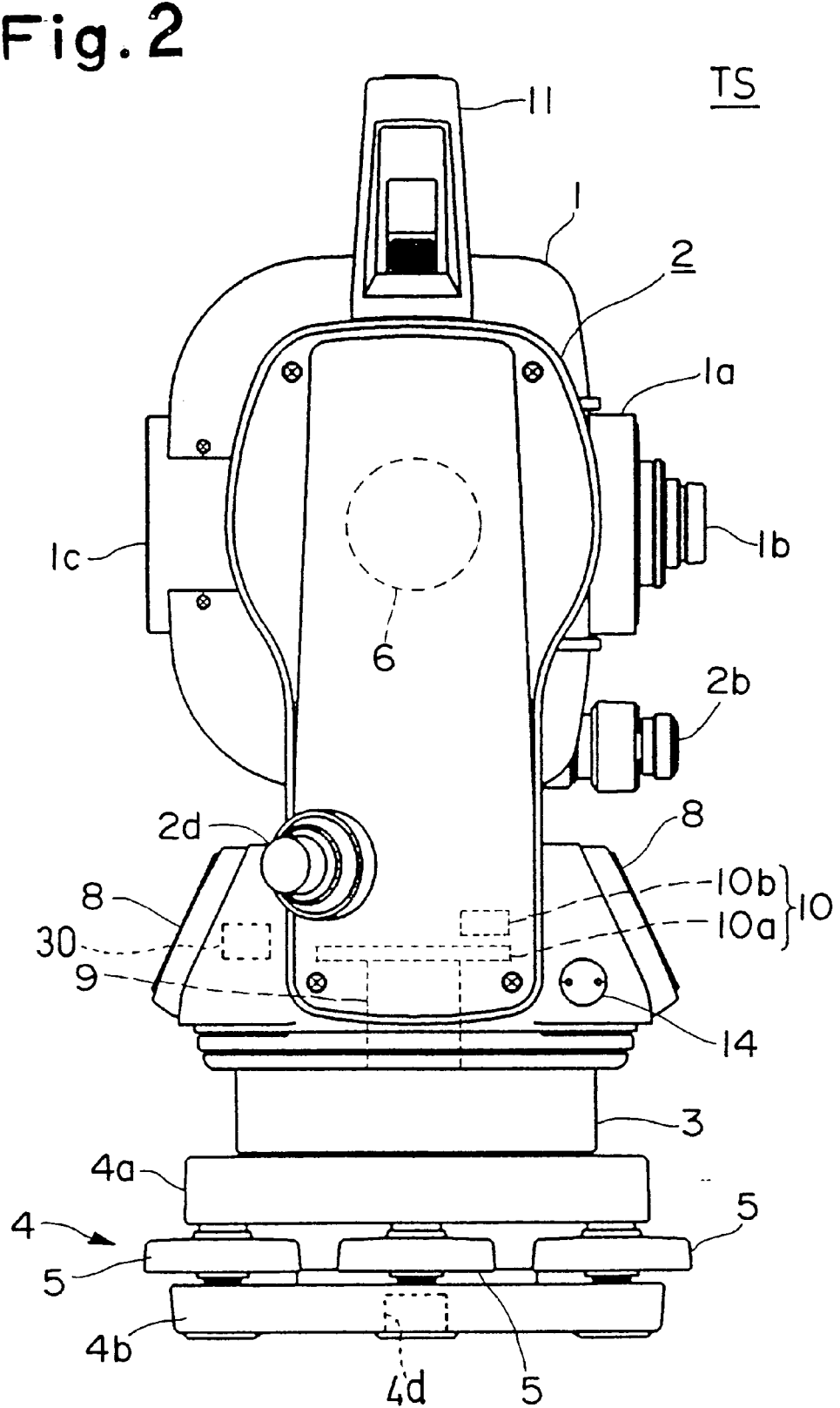
FIG. 2 is a side elevational view of the total station shown in FIG. 1.

FIGS. 1 and 2 show an embodiment of a total station (electronic measuring apparatus) TS. The total station TS is of a type which is designed as an electronic theodolite as a base of the total station TS in which an electronic distance meter is incorporated. The total station TS is provided with a body 2 on the top of which a grip portion 11 is secured. The total station TS is further provided at the bottom of the body 2 with a circular supporting member 3 which is rotatable relative to the body 2. The total station TS is further provided with a leveling block 4 which is connected to the bottom of the supporting member 3. The leveling block 4 includes a leveling board 4a, a base board 4b and three adjusting screws 5 positioned between the leveling board 4a and the base board 4b. The base board 4b is provided at a bottom thereof with a female screw hole 4d in which a connecting screw of a tripod (not shown) is screwed when the total station TS is mounted on the tripod.

The body 2 is formed in a substantially "U" shape as viewed in FIG. 1, so that a recess 2a is formed between the bifurcated portions of the body 2. The total station TS is provided with a telescope block 1 which is mounted on the body 2 so as to be positioned in the recess 2a.

The telescope block 1 is provided therein with a telescope 1a which is to be aimed at a reflector, e.g. a corner cube, precisely positioned at a surveying point. The telescope 1a is provided in a front portion 1c thereof with an objective lens group (not shown), and in a rear portion 1b thereof with an eyepiece 1d, so that an operator of the total station TS can see an image of an object to be aimed by looking into the rear portion 1b. The telescope 1a is also used as a light-transmitting optical system which transmits intensity-modulated light outward, and is also used as a light-receiving optical system which receives light reflected by the aforementioned reflector positioned at a surveying point. The telescope 1a is provided therein with a light emitter (not shown) for emitting the aforementioned intensity-modulated light, a light receiving element (not shown) which receives the light returned to the telescope 1a that has been emitted by the light emitter and reflected by the aforementioned reflector, and some other members.

The telescope 1a is pivoted at a horizontal shaft 6 which is supported at both ends thereof by respective bifurcated portions of the body 2, with the horizontal shaft 6 extending over the recess 2a. Therefore, the telescope 1a is rotatable about the horizontal shaft 6 in either a clockwise or counterclockwise direction as viewed in FIG. 2. In the body 2 an altitude-graduated circular plate 7a is secured to one end (left end as viewed in FIG. 1) of the horizontal shaft 6, so that the altitude-graduated circular plate 7a rotates together with the horizontal shaft 6 when the horizontal shaft 6 rotates. In the body 2 an encoder 7b, which includes a light emitter and a light receiver (both not shown) which receives light emitted by the light emitter, is fixed in the vicinity of a circumferential portion of the altitude-graduated circular plate 7a. The encoder 7b reads predetermined scale patterns formed on the altitude-graduated circular plate 7a. The altitude-graduated circular plate 7a and the encoder 7b together constitute a first incremental encoder 7 which generates pulses when the telescope block 1 rotates relative to the body 2. The number of pulses generated by the first incremental encoder 7 corresponds to an amount of rotation of the telescope block 1 relative to the body 2.

The body 2 is mounted on the supporting member 3 such that the supporting member 3 is pivoted at a vertical shaft 9 (see FIG. 2) about which the telescope block 1 is rotatable together with the body 2. The vertical shaft 9 extends perpendicular to the horizontal shaft 6 and is to be positioned to extend vertically when the total station TS is used. Due to such an arrangement, the supporting member 3 is rotatable relative to the body 2 in a plain extending in a horizontal direction as viewed in either FIG. 1 or FIG. 2. In a lower portion of the body 2 a horizontal-graduated circular plate 10a is secured to an upper end of the vertical shaft 9, so that the horizontal-graduated circular plate 10a rotates together with the vertical shaft 9 when the vertical shaft 9 rotates. An encoder 10b which includes a light emitter and a light receiver (both not shown) which receives light emitted by the light emitter is fixed in the vicinity of an circumferential portion of the horizontal-graduated circular plate 10a. The encoder 10b reads predetermined scale patterns formed on the horizontal-graduated circular plate 10a. The horizontal-graduated circular plate 10a and the encoder 10b together constitute a second incremental encoder 10 which generates pulses when the body 2 rotates relative to the supporting member 3. The number of pulses generated by the second incremental encoder 10 corresponds to an amount of rotation of the body 2 relative to the supporting member 3.

The total station TS is provided in the body 2 with a control device 30 (see FIG. 2) made of a CPU which serves as a central controller (internal circuit) 15 (see FIG. 4) to comprehensively control various operations to be performed in the total station TS. The total station TS is provided at a rear portion of the body 2 with a telescope tangent screw 2b for fine-adjusting the amount of rotation of the telescope block 1 relative to the body 2, while the total station TS is provided on a rear bottom portion of the body 2 with a horizontal rotation adjusting screw 2c for fine-adjusting the amount of rotation of the body 2 relative to the supporting member 3. As shown in FIG. 2, the body 2 is provided on a side wall at a bottom portion thereof with a sound generator 14 which generates a beep sound.

The body 2 is provided at each of its front face and rear face with an operational panel 8 that is electrically connected to the control device 30. The operational panel 8 is operated by an operator to manually select (set) a desired measuring mode from a plurality of-measuring modes of the total station TS. The plurality of measuring modes include a distance measuring mode; an angle measuring mode; a plurality of practical measuring modes including a shot measuring mode, stake out measuring mode, etc.; a plurality of adjusting modes including a temperature/barometer adjusting mode and a prism constant changing mode; and some other modes.

Figure 3:
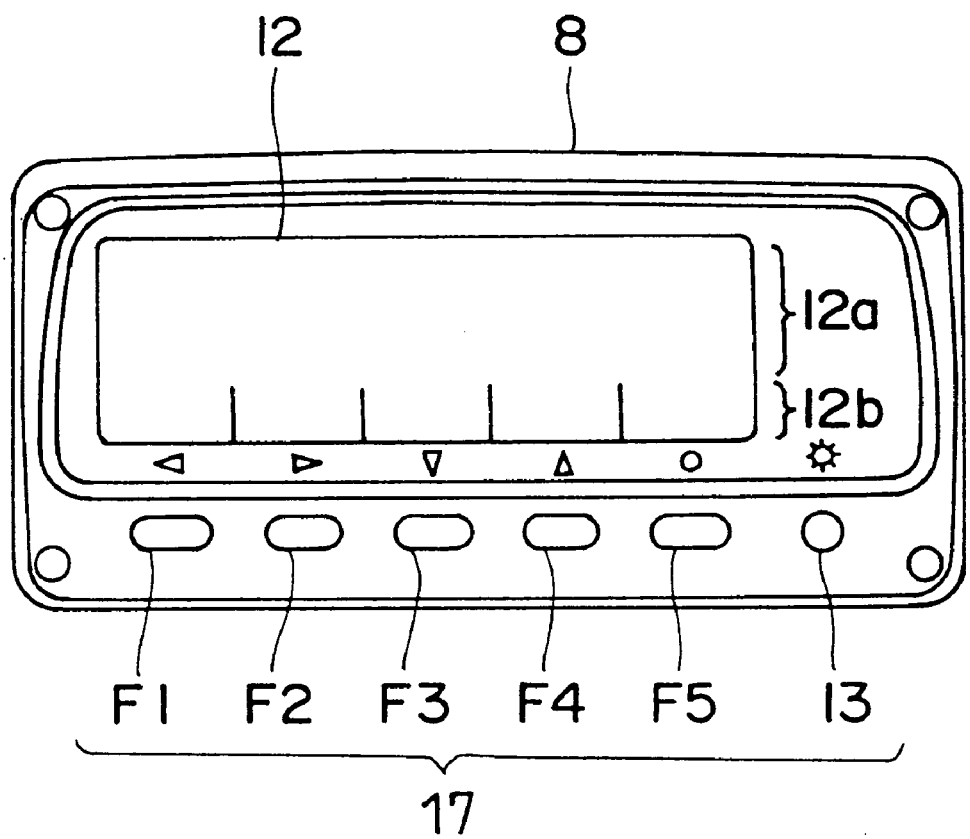
FIG. 3 is a plan view of an operational panel provided on the total station shown in FIG. 1.

FIG. 3 shows an enlarged view of the operational panel 8. The operational panel 8 is provided thereon with a rectangular LCD indication panel 12 which visually indicates various data, information, operational directions or the like, output from the control device 30. The operational panel 8 is further provided under the indication panel 12 with a plurality of operational buttons 17, i.e., six operational buttons F1, F2, F3, F4, F5 and 13. The buttons F1, F2, F3, F4 and F5 are function buttons or keys. Each of the function buttons F1, F2, F3, F4 and F5 operates to input that command to the control device 30 which is selectively set to each of the function buttons F1, F2, F3, F4 and F5, in accordance with the current measuring mode selected by the control device 30. Each of the function buttons F1, F2, F3, F4 and F5 also functions as a power switch of the total station TS for supplying electrical power of the battery 20 to the control device 30, i.e., the central controller 15.

The button 13 is an illumination light ON/OFF switch button and functions to turn ON or OFF a light emitter 16 (see FIG. 4) positioned behind the indication panel 12 for illuminating the same from behind. The illumination light ON/OFF switch button 13 also functions to start a presetting program (presetting operation) for presetting any one of the plurality of measuring modes which is to be called upon the power switch of the total station TS being turned ON, to a corresponding one of the function buttons F1 through F5.

The indication panel 12 is a dot-matrix type of LCD. The upper half of the indication panel 12 is a data indication division 12a, while the lower half of the indication panel 12 is a command indication division 12b, as shown in FIG. 3. In the data indication division 12a, information which corresponds to the measuring mode presently selected (or set) in the control device 30 is indicated. Such information indicated in the data indication division 12a may include, depending on the type of the measuring mode presently set, the calculated measuring result and the operational direction. The command indication division 12b is divided into five divisions to correspond to the function buttons F1, F2, F3, F4 and F5. In each of the five divisions of the command indication division 12b, a letter(s) or a mark which represents that command is indicated which has been set to the corresponding function button F1, F2, F3, F4 or F5 in accordance with the measuring mode presently selected (or set).

The aforementioned three adjusting screws 5 are disposed at equi-angular intervals in a circumferential direction between the leveling board 4a and the base board 4b. The angle of the leveling board 4a relative to the base board 4b can be adjusted by adjusting each adjusting screw 5, i.e., the leveling board 4a can be tilted relative to the base board 4b by adjusting each adjusting screw 5, so that the vertical shaft 9 can be adjusted so as to extend in a real vertical direction by adjusting each adjusting screw 5.

A centering bearing (not shown) is provided between the supporting member 3 and the leveling board 4a. The centering bearing makes it possible to shift the supporting member 3 relative to the leveling board 4a in a horizontal direction, so that a centering operation can be carried out in which the vertical shaft 9 is adjusted to be positioned at a position above a predetermined surveying point. The total station TS is provided on the body 2 with a centering telescope 2d. As shown in FIG. 2 the centering telescope 2d projects from the body 2 to form an eyepiece portion into which the operator looks. The centering telescope 2d has an objective optical system (not shown) which has its optical axis extending coaxial to the vertical shaft 9 so as to function to assist the aforementioned centering operation. The leveling board 4a is provided with a fixing screw 4c for restricting the relative movement between the supporting member 3 and the leveling board 4a.

Due to the aforementioned mechanical structure of the total station TS, the position of the telescope block 1 relative to the supporting member 3 can be flexibly adjusted. The angle of the telescope 1a is precisely detected through the first and second incremental encoders 7 and 10.

Figure 4:
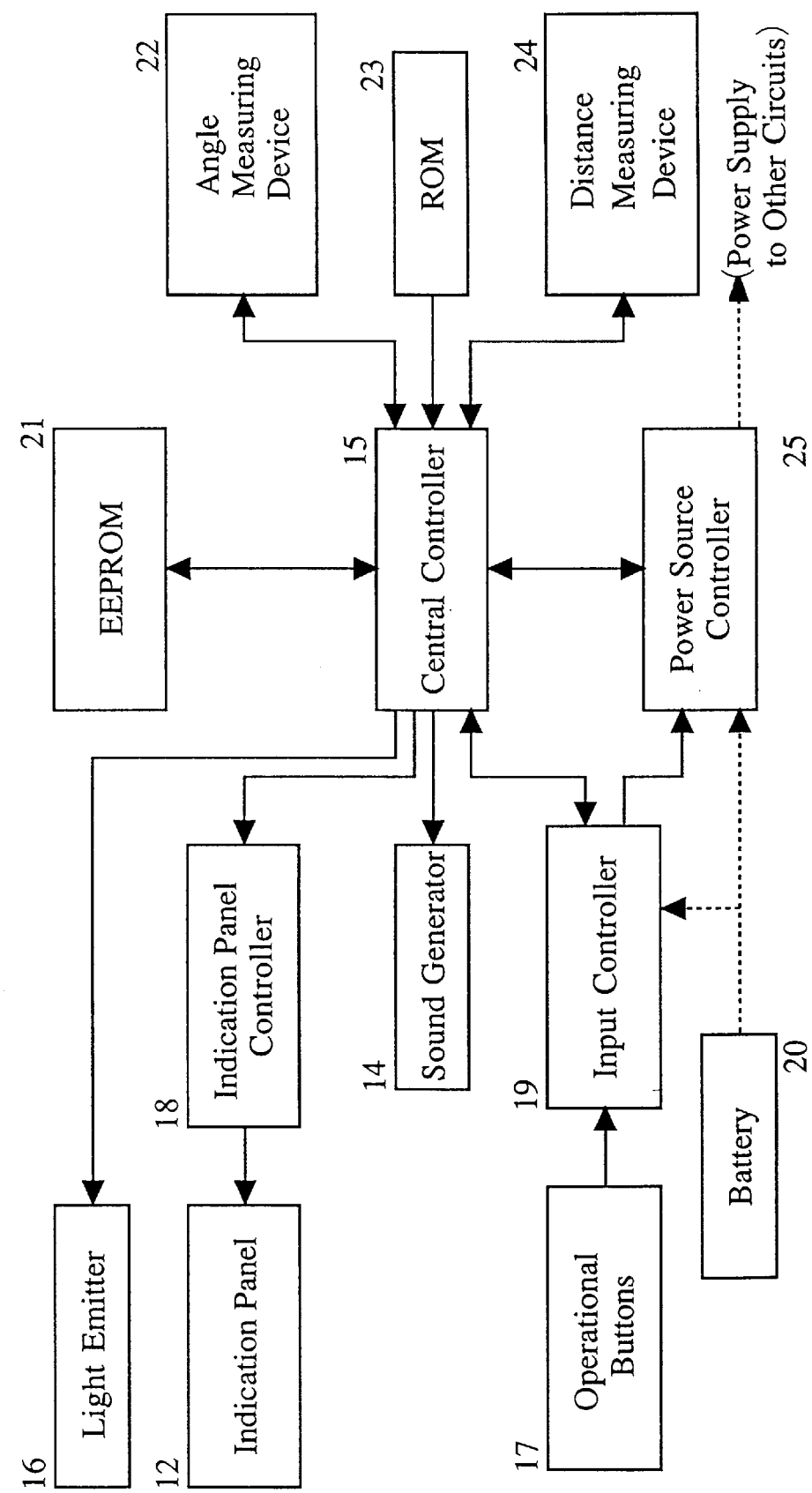
FIG. 4 is a block diagram showing various circuits provided in the total station shown in FIG. 1.

The electrical circuit provided in the total station TS will be hereinafter discussed in detail with reference to FIG. 4 which shows the circuit in the form of a block diagram.

The aforementioned sound generator 14, the light emitter 16, and an indication panel controller 18 which controls the indication panel 12, are electrically connected to the central controller 15. An input controller 19, to which the plurality of operational buttons 17 (the buttons F1, F2, F3, F4, F5 and 13) are electrically connected, a power source controller 25, an EEPROM (Electronic Erasable and Programmable Read Only Memory) 21, an angle measuring device 22, a ROM 23, and a distance measuring device 24 are further electrically connected to the central controller 15. A battery 20 is electrically connected to the input controller 19 and the power source controller 25.

Since the input controller 19 is directly connected to the battery 20, the input controller 19 receives electrical power from the battery 20 at all times regardless of the ON/OFF state of the power switch of the total station TS. The input controller 19 monitors the state (ON/OFF state) of each of the plurality of operational buttons 17 and informs the central controller 15 of a change in state (i.e., a condition that any of the operational buttons 17 is depressed) when the operator depresses any one of the operational buttons 17. The input controller 19 also informs the power source controller 25 of the aforementioned change in state when the operator depresses any one of the operational buttons 17 when the power switch is OFF.

Since the power source controller 25 is directly electrically connected to the battery 20, the power source controller 25, serving as a power supplying means, receives electrical power from the battery 20 at all times regardless of the ON/OFF state of the power switch of the total station TS. The power source controller 25 stops supplying power received from the battery 20 to the central controller 15 and some other predetermined blocks of the electrical circuit when the central controller 15 informs the power source controller 25 that the power switch has been turned OFF.

The angle measuring device 22 is a circuit block which functions as an electronic theodolite (ETH). The angle measuring device 22 includes the first and second encoders 7, 10 and inputs those pulses to the central controller 15 which are respectively generated by the first and second encoders 7, 10 due to the rotation of the telescope block 1 in both the vertical and horizontal planes.

The distance measuring device 24 is a circuit block which functions as an electronic distance meter (EDM). The distance measuring device 24 includes a light emitter, a light receiver, and a phase-difference detecting system, all of which are provided in the telescope block 1 and inputs the result of detection through the phase-difference detecting system to the central controller 15.

The ROM 23 stores various programs to be performed in the central controller 15 and various predetermined data or information. The various programs having been stored in the ROM 23 include a control program which is illustrated in the form of flow charts shown in FIGS. 7 through 9.

Figure 7:
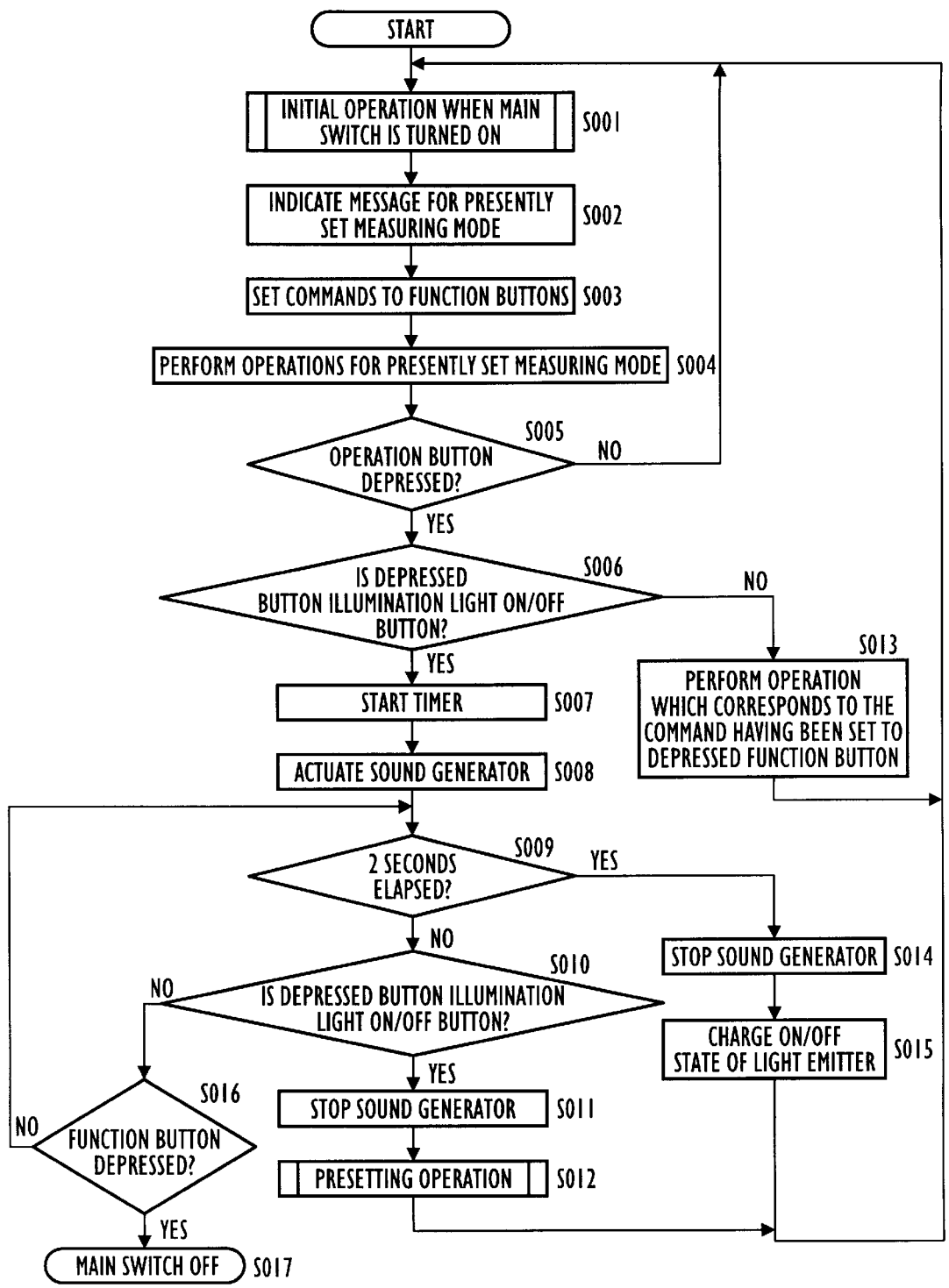
FIG. 7 is a flow chart which illustrates a control program performed in a central controller shown in FIG. 4.
Figure 8:
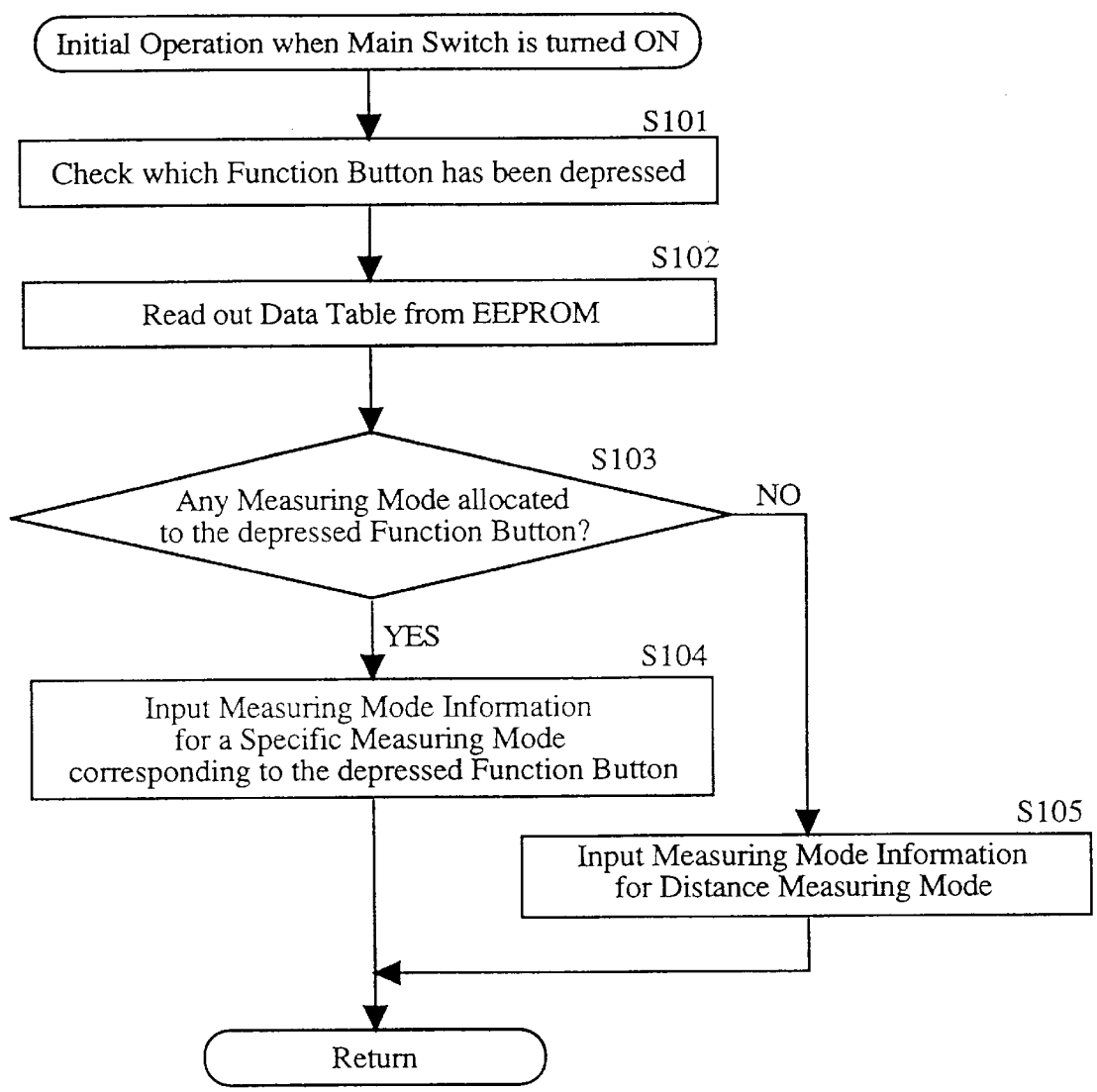
FIG. 8 is a flow chart which illustrates a subroutine performed at step S001 shown in FIG. 7.
Figure 9:
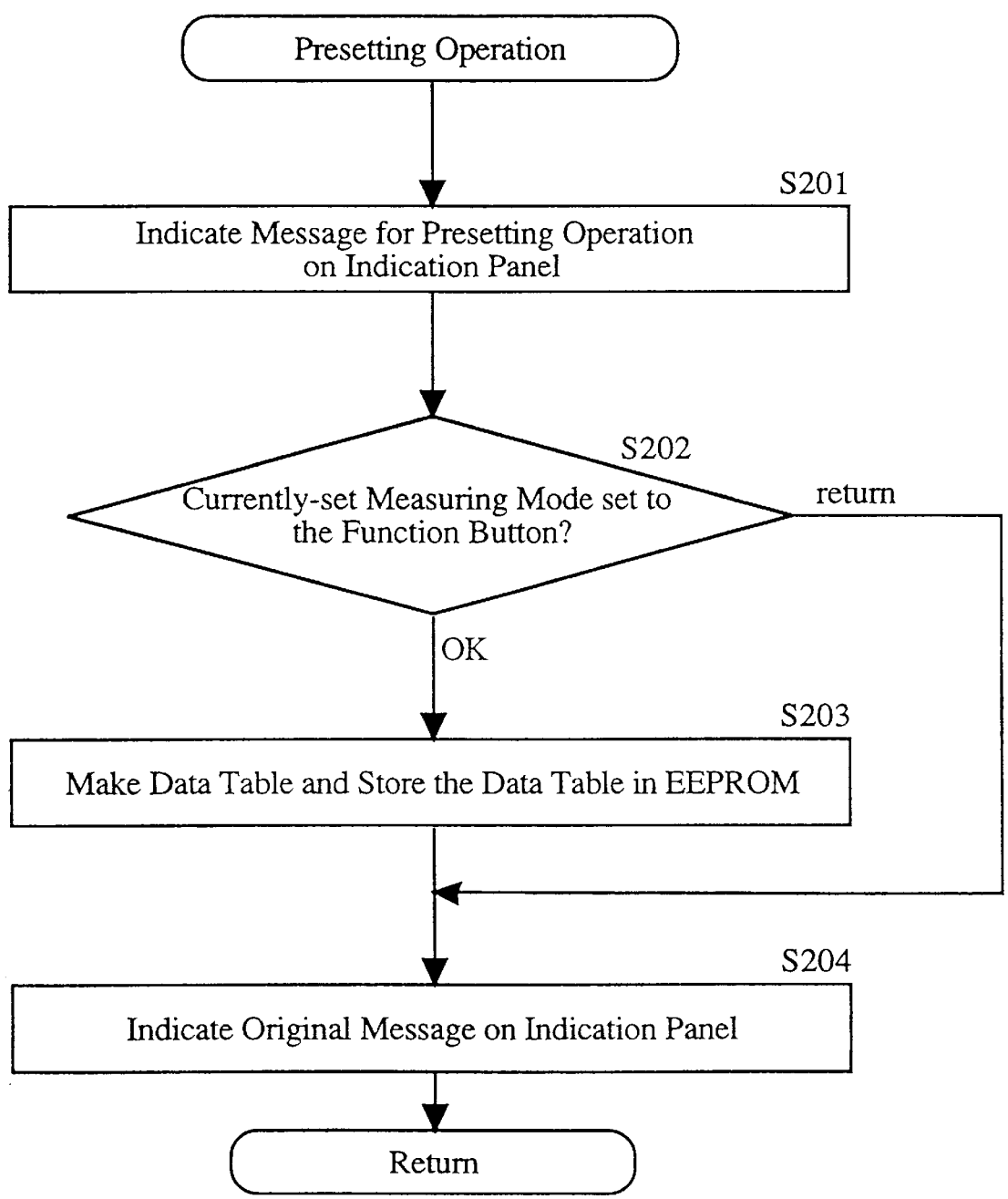
FIG. 9 is a flow chart which illustrates a subroutine performed at step S012 shown in FIG. 7.

In the ROM 23, measuring mode information (associating information which associates each one of a plurality of measuring modes with a corresponding measuring mode selection indication) has been stored which includes various data for each of the plurality of measuring modes which is set in the central controller 15 after the program shown in FIG. 7 through 9 has been performed.

FIG. 5 shows the measuring mode information for a shot measuring mode, which is one of the plurality of measuring modes of the total station TS selectable by the operator. In the shot measuring mode, a distance measuring operation is performed a predetermined number of times. The measuring mode information for the shot measuring mode includes display information to be visually indicated on the indication panel 12. The display information includes the name of the measuring mode which is indicated "1. shot measurement" in the upper half division 12a of the indication panel 12 as shown in FIG. 5, and corresponding visual direction marks "next" and "OK" which are respectively indicated above the function buttons F4, F5. The display information further includes commands which are respectively set to the function buttons F1, F2, F3, F4 and F5 when the display information of the shot measuring mode is indicated on the indication panel 12. The display information further includes the head address of the program (distance measuring program) which is to be performed in the shot measuring mode. The distance measuring program has also been stored in the ROM 23. Similarly, measuring mode information for each of the other measuring modes has also been stored in the ROM 23. The programs to be performed in those other measuring modes have also been stored in the ROM 23.

On being supplied power from the power source controller 25, the central controller 15 carries out the aforementioned control program stored in the ROM 23 so as to comprehensively control the total station TS. By performing the control program, the central controller 15 reads the measuring mode information for one of the plurality of measuring modes from the ROM 23 to set the one of the plurality of measuring modes. Subsequently, the central controller 15 carries out the program a head address of which is included in the measuring mode information for the set measuring mode so as to perform a corresponding operation. For instance, a distance value is calculated in accordance with phase-difference information obtained from the distance measuring device 24, or an angle value is calculated in accordance with pulses output from the angle measuring device 22. The central controller 15 sends the corresponding display information for each of the plurality of measuring modes to the indication panel controller 18. When the central controller 15 sends such corresponding display information to the indication panel controller 18, in the case where such data as a distance value and an angle value or an operational demand have been obtained as a result of having performed the corresponding program of a selected measuring mode, the central controller 15 firstly registers such data, or the operational command, in the corresponding display information and thereafter sends the corresponding display information to the indication panel controller 18.

In the case that the illumination light ON/OFF switch button 13 is consecutively depressed twice in a row within a predetermined period of time (two seconds in this particular embodiment), the aforementioned presetting program (operation) is performed for presetting any one of the plurality of measuring modes which is to be called upon the power switch of the total station being turned ON, to a corresponding one of the function buttons F1 through F5. By calling the presetting program, one of the plurality of measuring modes which is presently set, can be allocated or set to a predetermined one of the function buttons F1 through F5. In the presetting program, data for allocation is formed as a data table (associating information which associates one of the mode selecting buttons with one of the plurality of measuring modes) as shown in FIG. 6 that indicates which measuring mode is preset to which function button F1, F2, F3, F4 or F5, and the data table is stored in the EEPROM 21. The data table consists of one or more than one function button number 1, 2, 3, 4 or 5 each of which corresponds to a corresponding one of the five function buttons F1 through F5, and the name or names of the corresponding measuring mode or modes to be preset. Since the data table is stored in the EEPROM 21 which is able to sustain its stored data without power being supplied thereto, the data table remains stored in the EEPROM 21 even after the power switch is turned OFF.

When the power switch of the total station TS is turned ON by an act of depressing one of the function buttons F1 through F5, the central controller 15 checks, at an initial stage in the aforementioned control program stored in the ROM 23 having being performed, whether the aforementioned data table to be preset for the depressed one of the function buttons F1 through F5 has been stored in the EEPROM 21. In the case where it is checked that such a data table has been stored in the EEPROM 21, the central controller 15 reads from the EEPROM 21 the measuring mode information for one of the plurality of measuring modes which has been preset to the depressed one of the function buttons F1 through F5 and sets the one of the plurality of measuring modes as an initial measuring mode to be set immediately after the power switch is turned ON. In the case where it is checked that no data table has been stored in the EEPROM 21, the central controller 15 sets the distance measuring mode (regular measuring mode), which is one of the plurality of measuring modes that the total station TS has, as the initial measuring mode.

Upon receiving display information from the central controller 15, the indication panel controller 18 converts the received display information into dot data suitable for the dot-matrix of the indication panel 12 so as to indicate the display information on the indication panel 12.

The operations performed by the aforementioned control program stored in the ROM 23 will be hereinafter discussed with reference to FIGS. 7 through 9.

The operation of the control program shown in FIG. 7 starts when electrical power is supplied to the central controller 15 from the power source controller 25. That is, the operation of the control program starts at the time any one of the function buttons F1 through F5 is depressed. At step S001 the central controller 15 performs an initial operation shown as a subroutine in FIG. 8. At step S101, it is checked which function button F1, F2, F3, F4 or F5 has been depressed by communicating with the input controller 19, and subsequently, the number (1, 2, 3, 4 or 5) of the depressed function button F1, F2, F3, F4 or F5 obtained as a result of the communication with the input controller 19 is stored in a memory (not shown) provided in the central controller 15.

At step S102, the central controller 15 reads out all the data stored in the data table from the EEPROM 21. At step S103, the central controller 15 checks whether any measuring mode has been allocated or preset to the depressed one of the plurality of function buttons F1 through F5. Namely, the central controller 15 checks whether the data table for the number of the depressed function button F1, F2, F3, F4 or F5 stored in the memory at step S101 exists.

In the case where the data table does not exist, that is, in the case where any measuring mode has not been allocated or preset to the depressed function button F1, F2, F3, F4 or F5, control proceeds to step S105, at which the central controller 15 inputs the measuring mode information for the distance measuring mode from the ROM 23 to thereby set the distance measuring mode in the central controller 15. The distance measuring mode has been preset as an initial mode to be called upon the power switch of the total station TS being turned ON, during a manufacturing process of the total station TS, i.e., before the total station TS is brought onto the market.

Conversely, in the case where the data table exists, that is, in the case where any measuring mode has been allocated or preset to the depressed function button F1, F2, F3, F4 or F5, control proceeds to step S104, at which the central controller 15 inputs the measuring mode information for a specific measuring mode from the plurality of measuring modes, the name of which is registered in the data table for the depressed function button F1, F2, F3, F4 or F5, from the ROM 23 to thereby set the specific measuring mode in the central controller 15.

After either operation at step S104 or S105, control finishes performing the initial operation of the subroutine shown in FIG. 8 to return to the main routine shown in FIG. 7, i.e., to proceed to step S002.

At step S002 the central controller 15 controls the indication panel 12 to indicate the information (message) for the presently-set measuring mode. That is, the central controller 15 sends the display information included in the latest measuring mode information last read from the ROM 23 to the indication panel controller 18. When the central controller 15 sends such display information to the indication panel controller 18 in the case where data such as a distance value and an angle value or an operational demand have been obtained, the central controller 15 firstly registers such data or the operational command in the display information and thereafter sends the display information to the indication panel controller 18, as noted above.

At step S003, the central controller 15 allocates or sets various commands for the presently-set measuring mode to respective function buttons F1 through F5 in a corresponding manner. That is, the central controller 15 allocates various commands included in the latest measuring mode information read last from the ROM 23 to respective function buttons F1 through F5 in a corresponding manner.

At step S004 the central controller 15 performs operations for the presently-set measuring mode. That is, the central controller 15 reads out the corresponding program from the ROM 23 in accordance with the head address of the program in the latest measuring mode information last read from the ROM 23 to perform the read program. For instance, in the distance measuring mode (see step S302 shown in FIG. 10A), the distance from the total station TS to a surveying point where a corner cube prism or the like is positioned is measured in accordance with the phase-difference information obtained from the distance measuring device 24. For instance, in the angle measuring mode (see step S311 shown in FIG. 10B), the altitude and the horizontal angle of an object to be measured are measured in accordance with pulses input from the angle measuring device 22.

At step S005 the central controller 15 monitors the input controller 19 to check the ON/OFF state of each of the plurality of operational buttons 17, i.e., to check whether any one of the plurality of operational buttons 17 is depressed. In the case where it is determined at step S005 that none of the operational buttons 17 have been depressed, control returns to step S002, so that the operations at step S002 through step S005 are repeated.

In the case where it is checked at step S005 that one of the operational buttons 17 has been depressed, control proceeds to step S006 to check whether the depressed operational button 17 is the illumination light ON/OFF switch button 13. If it is determined at step S006 that the depressed operational button 17 is not the illumination light ON/OFF switch button 13, control proceeds to step S013 to perform an operation which corresponds to the command having been set to the depressed function button F1, F2, F3, F4 or F5. Such an operation is included in the program read from the ROM 23 at step S004. For instance, in a measuring mode selecting mode (see step S303 shown in FIG. 10A), in the case where the function button F1 to which a special measuring mode calling command has been set is depressed, the central controller 15 reads out the measuring mode information for the shot measuring mode from the ROM 23. In this particular case, the measuring mode having been set in the central controller 15 is replaced by another measuring mode particular to the latest measuring mode information last read from the ROM 23. Furthermore, in the angle measuring mode (see step S311 shown in FIG. 10B), in the case where the function button F3 to which a zero setting command has been set, is depressed, a horizontal angle or angles having been calculated up to the present are all reset, and subsequently the current position of the body 2 is set to zero degrees (0°).

In the case where it is determined at step S006 that the depressed operational button 17 is the illumination light ON/OFF switch button 13, control proceeds to step S007 to start a 2-second timer which is a software timer in which the time is up after counting two seconds.

At step S008 the central controller 15 actuates the sound generator 14 to generate a beep sound. Thereafter, at step S009, the central controller 15 checks whether the 2-second timer has already counted two seconds since the illumination light ON/OFF switch button 13 was depressed. If it is determined at step S009 that two seconds has not yet elapsed, control proceeds to step S010 to check if the illumination light ON/OFF switch button 13 has again been depressed. If it is determined at step S010 that the illumination light ON/OFF switch button 13 was not again depressed, control proceeds to step S016 to check if any one of the function buttons F1 through F5 has been depressed. If none of the function buttons F1 through F5 has been depressed, control returns to step S009.

At step S009, in the case where it is determined that the time is up, i.e., that two seconds has elapsed, control proceeds to step S014 to control the sound generator 14 to stop generating the beep sound. Subsequently, control proceeds to step S015 to perform an ON/OFF state changing operation for changing the ON/OFF state of the light emitter 16, i.e., turning the light emitter 16 ON when it is OFF or OFF when it is ON. Thereafter, control returns to step S001.

At step S010, in the case where it is determined that the illumination light ON/OFF switch button 13 has again been depressed, control proceeds to step S011 to control the sound generator 14 to stop generating the beep sound. Subsequently, control proceeds to step S012 to perform the aforementioned presetting operation or program, which is shown as a subroutine in FIG. 9.

At step S201 the central controller 15 controls the indication panel controller 18 to indicate a predetermined message for the presetting operation on the indication panel 12. This predetermined message includes a message "Set XXX mode to YYY button?" which is indicated in the data indication division 12a. In the above-indicated "XXX mode", the name of the presently-set measuring mode (measuring mode particular to the latest measuring mode information last read from the ROM 23) is indicated. In the above-indicated "YYY button", the number of the specific function button which has been stored in the memory at step S101 is indicated. For instance, as shown at step S405 shown in FIG. 11, a message "Set Shot Measuring Mode to F3 Button?" is indicated in the data indication division 12a of the indication panel 12. The aforementioned predetermined message further includes a message "return" and a message "OK" which are respectively indicated in the command indication division 12b above the function buttons F4 and F5.

At step S202 it is checked whether the measuring mode presently set is to be set to the corresponding function button F1, F2, F3, F4 or F5. Namely, it is checked whether the function button F4 corresponding to the message "return" has been depressed or the function button F5 corresponding to the message "OK" has been depressed. In the case where it is determined at step S202 that the function button F4 has been depressed, control proceeds to step S204.

In the case where it is determined at step S202 that the function button FS has been depressed, control proceeds to step S203. At step S203, the central controller 15 makes the data table which associates the number (1, 2, 3, 4 or 5) of one of the function buttons F1 through F5 which has been depressed to turn the power switch of the total station TS ON, with the presently-set measuring mode, and subsequently, the central controller 15 renews data in the EEPROM 21 by storing the data table just made. Namely, at step S203, in the case where an old data table has already been stored in the EEPROM 21, the central controller 15 replaces the old data table by the new data table in the EEPROM 21. Thereafter, control proceeds to step S204.

At step S204, the central controller 15 controls the indication panel controller 18 to have the indication panel 12 indicate the original message on the indication panel 12. Namely, the central controller 15 informs the indication panel controller 18 of the display data included in the latest measuring mode information read from the ROM 23. Thereafter, control returns to the main routine shown in FIG. 7 so as to return to step S002.

If it is determined at step S016 that one of the function buttons F1 through F5 has been depressed, control proceeds to step S017 at which the central controller 15 controls the power supply controller 25 to stop supplying power from the battery 20 to the central controller 15 and some other predetermined blocks of the electrical circuit, i.e., the power switch of the total station is turned OFF. Upon the power supply controller 25 stopping the supply of power to the central controller 15, the central controller 15 stops performing its operation shown in FIG. 7. However, even after the power switch has been turned OFF, the data table stored in the EEPROM 21 remains stored in the EEPROM 21, as mentioned above.

The operation of the total station TS (transition of the message indicated on the indication panel 12) will be hereinafter discussed with reference to the flow chart shown in FIG. 10.

Before the power switch of the total station TS is turned ON, nothing is indicated on the indication panel 12 (S301). With the power switch being in this OFF state, if one of the function buttons F1 through F5 is depressed, the input controller 19 recognizes this action of depression and informs the power supply controller 25 that one of the function buttons F1 through F5 has been depressed. Upon receiving the information from the input controller 19, the power supply controller 25 starts supplying the electric power of the battery 20 to the central controller 15 and other circuits, i.e., the power switch of the total station TS is turned ON. Immediately after the power switch is turned ON, the central controller 15 checks if the data table for the depressed one of the function buttons F1 through FS is stored in the EEPROM 21. In the case where it is determined that such a data table has not been stored in the EEPROM 21, the central controller 15 inputs the measuring mode information for the distance measuring mode to set the distance measuring mode in accordance with the input measuring mode information. Namely, the message corresponding to the distance measuring mode is indicated on the indication panel 12, and at the same time various commands unique to the distance measuring mode are respectively set to the function buttons F1, F2, F3, F4 and FS (S302). Subsequently, the central controller 15 carries out the program, a head address of which is included in the measuring mode information for the distance measuring mode. Through this program, an oblique distance is calculated in accordance with phase-difference information obtained from the distance measuring device 24, an altitude and a horizontal angle are calculated in accordance with pulses output from the angle measuring device 22, and a horizontal distance is calculated by using the calculated oblique distance and the altitude and the horizontal angle. The calculated horizontal distance and the horizontal angle are indicated on the indication panel 12.

Upon entering the distance measuring mode shown at step S302, a measuring mode selecting mode selecting command is set to the function button F5. Therefore, if the function button F5 is depressed at this stage, the central controller performs a measuring mode selecting operation which corresponds to the aforementioned measuring mode selecting mode selecting command, to read out the measuring mode information for the measuring mode selecting mode from the ROM 23. Subsequently, the central controller 15 sets the measuring mode selecting mode in accordance with the measuring mode information read. Namely, the message "Select Mode" unique to the measuring mode selecting mode is indicated on the indication panel 12 and at the same time various commands unique to the measuring mode selecting mode are respectively set to the function buttons F1, F2, F3, F4 and F5 (S303). In this setting, a shot measuring mode selecting command, a temperature/barometer adjusting mode selecting command, and an angle measuring mode selecting command are set to the function buttons F1, F2 and F3, respectively. At the same time, the head addresses of all programs of which are included in the latest measuring mode information, are loaded to the central controller 15 so that the central controller 15 is capable of performing an operation which corresponds to a command set to a corresponding one of the function buttons F1 through F5 at any time.

At the stage at step S303 where the measuring mode selecting mode is set, if the function button F1 to which the shot measuring mode selecting command has been set is depressed, the central controller 15 performs a shot measuring mode selecting operation which corresponds to the aforementioned shot measuring mode selecting command to read out the measuring mode information for the shot measuring mode (shown in FIG. 5) from the ROM 23. Subsequently, the central controller 15 sets the shot measuring mode (practical measuring mode) in accordance with the measuring mode information read. Namely, the message unique to the shot measuring mode is indicated on the indication panel 12, and at the same time a stake out measuring mode selecting command and a shot measuring mode confirming command are set to the function buttons F4 and F5, respectively (S304). At this stage, if the function button F5 is depressed, the central controller 15 starts performing the program, a head address of which is included in the measuring mode information, for the shot measuring mode to thereby carry out a shot measurement in which the distance measuring operation is performed a predetermined number of times by controlling the angle measuring device 22 and the distance measuring device 24.

At the stage at step S304 where the shot measuring mode is set, if the function button F4 is depressed, the central controller 15 performs a stake out measuring mode selecting operation which corresponds to the aforementioned stake out measuring mode selecting command to read out the measuring mode information for the stake out measuring mode from the ROM 23. Subsequently, the central controller 15 sets the stake out measuring mode (practical measuring mode) in accordance with the measuring mode information read (S305). In the stake out measuring mode, the difference between a reference distance value and a calculated actual distance value is calculated to be indicated on the indication panel 12.

Thereafter, each time the function button F4 is depressed, a REM (Remote Elevation Measurement) mode, a RDM (Remote Distance Measurement) mode and a coordinate measuring mode, each of which is a practical measuring mode, are set in turns (S306, S307 and S308). In each of the REM mode, the RDM mode and the coordinate measuring mode, if the function button F5 is depressed, a measuring operation unique to the presently-set measuring mode is performed. In the REM mode, the elevation of an object to be surveyed is calculated. For this calculation in the REM measuring mode, a reflector such as a corner cube is positioned at a position below the object to be surveyed. In the RDM mode, a horizontal distance between two surveying points and a difference in elevation between the two surveying points are calculated. In the coordinate measuring mode, the coordinate value (X,Y,Z) of a surveying point is calculated, with the position at which the total station TS is located being considered the origin (X=0, Y=0, Z=0).

Upon entering the coordinate measuring mode shown at step S308, a measuring mode selecting mode selecting command is set to the function button F4. Therefore, in the case where the coordinate measuring mode is set, if the function button F4 is depressed, the measuring mode selecting mode shown at step S303 is again set.

In the case where the measuring mode selecting mode shown at step S303 is set, if the function button F2 is depressed, the central controller 15 performs an operation which corresponds to the aforementioned temperature/barometer adjusting mode selecting command to read out the measuring mode information for the temperature/barometer adjusting mode (adjusting mode) from the ROM 23. Subsequently the central controller 15 sets the temperature/barometer adjusting mode in accordance with the measuring mode information read. Namely, the message unique to the temperature/barometer adjusting mode is indicated on the indication panel 12 and at the same time a prism constant changing mode selecting command and a confirming command are set to the function buttons F4 and F5, respectively (step S309). At this stage, if the function button F5 is depressed, the central controller 15 starts performing the program, a head address of which is included in the measuring mode information, for the temperature/barometer adjusting mode to thereby carry out a temperature/barometer adjusting operation. In the temperature/barometer adjusting mode, a temperature value and a barometer value, which are used as parameters for calculating a distance in the distance measuring mode, are each adjusted or varied. The temperature value and the barometer value may be manually or automatically input.

At the stage at step S309 where the temperature/barometer adjusting mode is set, if the function button F4 is depressed, the central controller 15 performs a prism constant changing mode selecting operation which corresponds to the aforementioned prism constant changing mode selecting command to read out the measuring mode information for the prism constant changing mode (adjusting mode) from the ROM 23. Subsequently, the central controller 15 sets the prism constant changing mode (practical measuring mode) in accordance with the measuring mode information read (S310). At this stage, if the function button F5 is depressed, the central controller 15 starts performing the program, a head address of which is included in the measuring mode information, for the prism constant changing mode to thereby carry out a prism constant changing operation. In the prism constant changing mode, a prism constant, which is peculiar to a corner cube and is used as a parameter for calculating a distance in the distance measuring mode is changed. Upon entering the prism constant changing mode, a measuring mode selecting mode selecting command is set to the function button F4. Therefore, in the case where the prism constant changing mode is set, if the function button F4 is depressed, the measuring mode selecting mode shown at step S303 is again set.

In the case where the measuring mode selecting mode shown at step S303 is set, if the function button F3 to which the angle measuring mode selecting command has been set is depressed, the central controller 15 performs an operation which corresponds to the angle measuring mode selecting command to read out the measuring mode information for the angle measuring mode from the ROM 23. Subsequently, the central controller 15 sets the angle measuring mode in accordance with the measuring mode information read. Namely, the message unique to the angle measuring mode is indicated on the indication panel 12 and at the same time various commands unique to the angle measuring mode are respectively set to the function buttons F1, F2, F3, F4 and F5 (S311). Subsequently, the central controller 15 carries out the program, a head address of which is included in the measuring mode information, for the angle measuring mode. Through this program, an altitude and an horizontal angle are respectively calculated in accordance with pulses output from the angle measuring device 22. The calculated altitude and horizontal angle are indicated on the indication panel 12.

Upon entering the angle measuring mode shown at step S311, a detailed angle measuring mode selecting command is set to the function button F5. Therefore, if the function button F5 is depressed at this stage, the central controller 15 performs a detailed angle measuring mode selecting operation which corresponds to the aforementioned detailed angle measuring mode selecting command to read out the measuring mode information for the detailed angle measuring mode from the ROM 23. Subsequently, the central controller 15 sets the detailed angle measuring mode in accordance with the measuring mode information read. Namely, the message unique to the detailed angle measuring mode is indicated on the indication panel 12, and at the same time various commands unique to the measuring mode selecting mode are respectively set to the function buttons F1, F2, F3, F4 and F5 (S312).

In the case where the detailed angle measuring mode shown at step S312 is set, if the function button F5, to which a measuring mode selecting mode selecting command has been set, is depressed, the measuring mode selecting mode shown at step S303 is again set.

Figure 11:
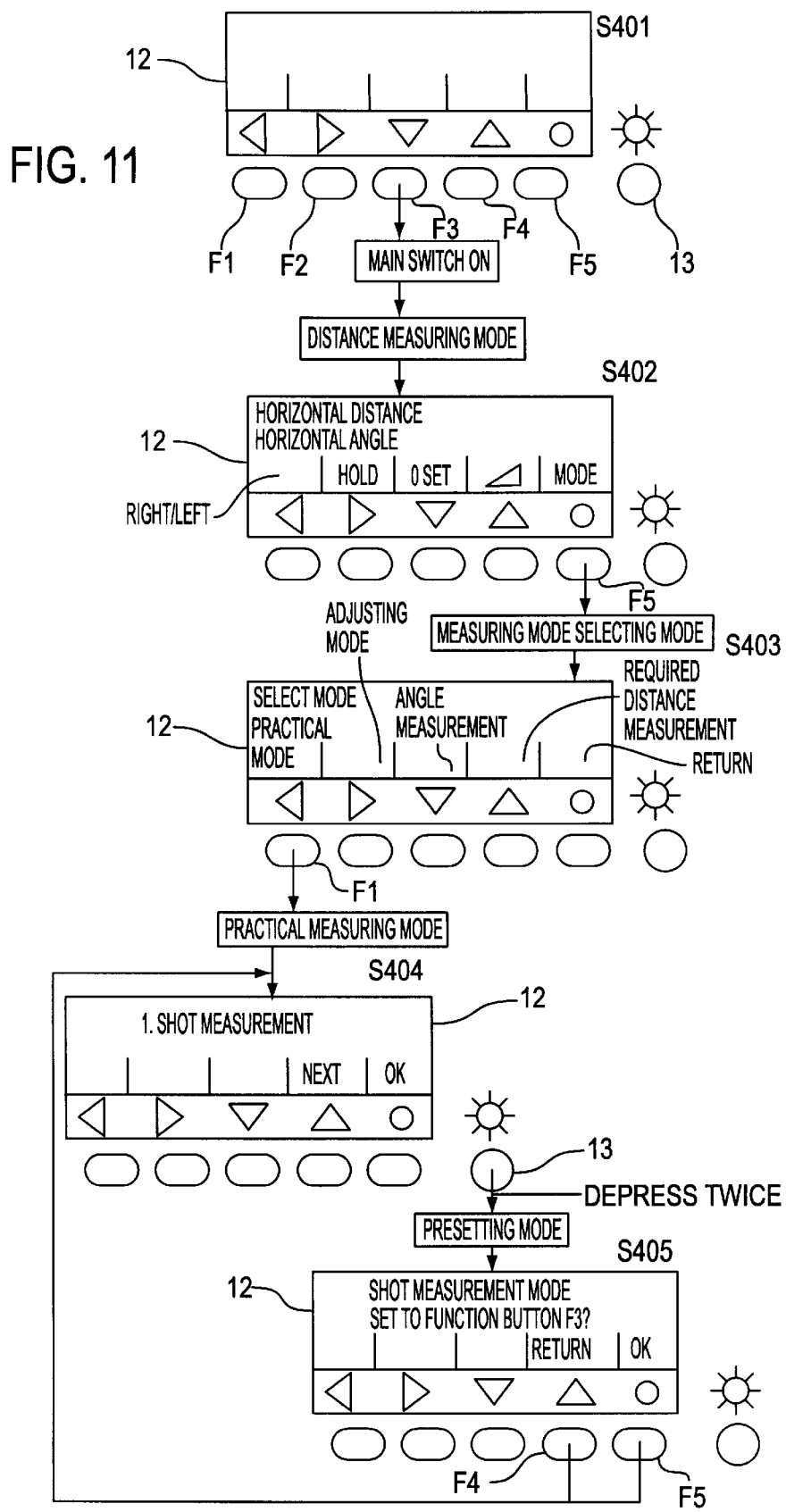
FIG. 11 is a flow chart which illustrates the transition of the message indicated on the indication panel when a presetting operation is operated.
Figure 12:
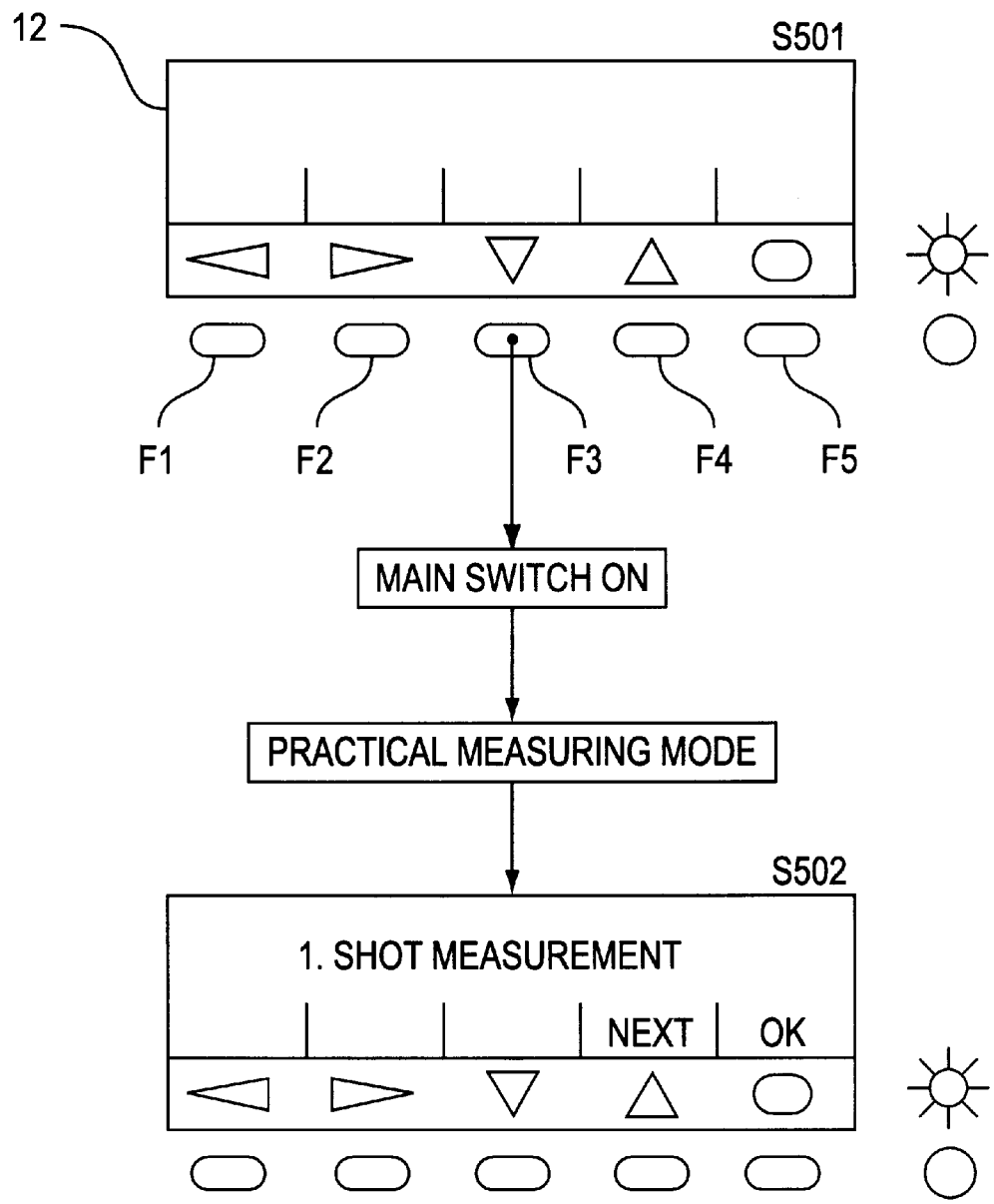
FIG. 12 is a flow chart which illustrates the transition of the message indicated on the indication panel when one of the function buttons to which a measuring mode has been preset through the presetting operation.
Figure 13:
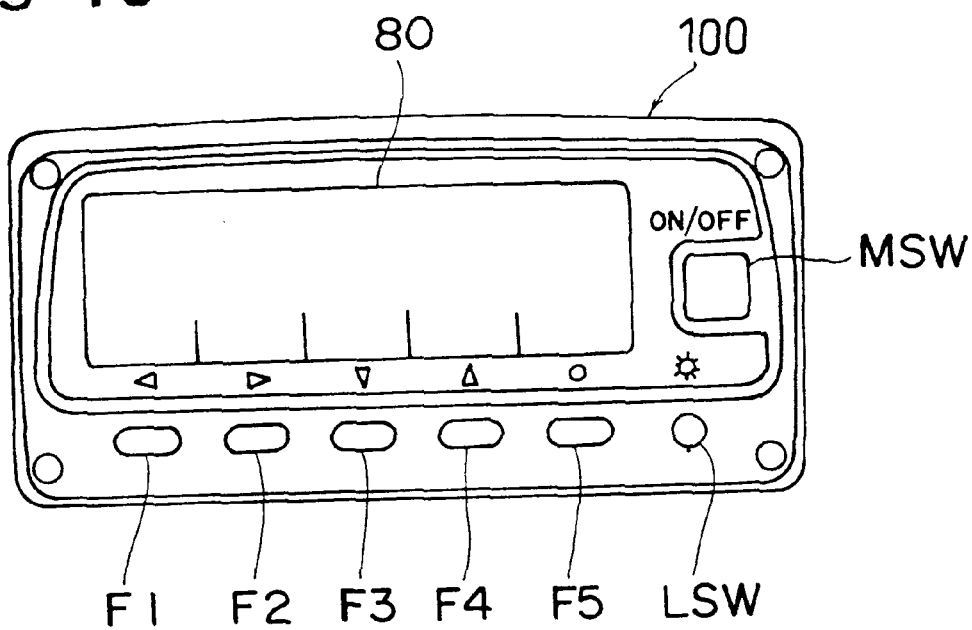
FIG. 13 is a plan view of an operational panel provided on a conventional electronic measuring apparatus.

The setting or allocating operation in which any one of the plurality of measuring modes is set to a corresponding one of the function buttons F1 through F5 will be hereinafter discussed with reference to FIG. 11.

It is herein assumed that the function button F3 is depressed to turn the power switch ON as shown at step S401. Upon this depression of the function button F3, the number "3" of the function button F3 is stored in the memory (not shown) in the central controller 15.

Thereafter, as a result of having performed several operations at steps S402, S403 and S404 in a manner similar to the aforementioned manner, it is assumed that the shot measuring mode is set as shown at step S404. At this stage, it is assumed that the illumination light ON/OFF switch button 13 is consecutively depressed twice in a row within two seconds. Upon this depression, a measuring mode selecting button presetting mode is set, i.e., the aforementioned presetting operation shown in FIG. 9 is performed, so that the message unique to the presetting mode is indicated on the indication panel 12 (S405).

At this stage, if the function button F4 is depressed, control returns to S404, so that the shot measuring mode is set and the message unique to this mode is indicated on the indication panel 12. Conversely, if the function F5 is depressed, the shot measuring mode which has been presently set is allocated to the function button F3 whose function button number "3" has been stored in the memory in the central controller 15. Namely, the central controller 15 makes the data table which associates the function button number "3" with the name of the shot measuring mode "Shot Measurement", and subsequently, the data table is stored in the EEPROM 21. Thereafter, control returns to S404, so that the message unique to the shot measuring mode is indicated on the indication panel 12. In the case where the message unique to the shot measuring mode is indicated on the indication panel 12 as shown at step S404, if the function button F5 is depressed, a shot measurement is carried out, i.e., a distance measuring operation is performed a predetermined number of times.

Under the condition that the shot measuring mode has been preset to the function button F3 in the aforementioned manner, if the function button F3 is depressed to turn the power switch ON (S501), the central controller 15 checks if the data table for the depressed function button F3 is stored in the EEPROM 21. Since such a data table has been stored in the EEPROM 21, the central controller 15 inputs the measuring mode information for the shot measuring mode, the name of which has been registered in the data table. Subsequently, the central controller 15 sets the shot measuring mode in accordance with the input measuring mode information for the shot measuring mode. Namely, the message unique to the shot measuring mode is indicated on the indication panel 12 and at the same time a stake out measuring mode selecting command and a shot measuring mode confirming command are set to the function buttons F4 and F5, respectively (S502).

Even after one of the plurality of measuring modes has been set to a corresponding one of the function buttons F1 through F5 in the aforementioned manner, the measuring mode automatically set after the power switch is turned ON can be changed to another measuring mode by operating the operational buttons 17 in a manner similar to the case discussed before where no measuring mode has yet been set to a corresponding one of the function buttons F1 through F5.

As can be understood from the foregoing, according to the above embodiment of the total station TS, the power switch of the total station TS is turned ON and simultaneously a desired measuring mode is called to be set immediately after one of the function buttons F1 through F5 is depressed only once, if only the aforementioned presetting operation (program) has been performed beforehand in which the desired measuring mode is set to a corresponding one of the function buttons F1 through F5. Therefore, in order to call a desired measuring mode, the operator does not have to depress one or more than one operational or function button more than once, unlike a conventional total station or electronic measuring apparatus. In addition, in the case where the power switch of the total station TS has to be turned OFF even in the middle of a surveying operation in a specific measuring mode, the specific measuring mode will soon resume as soon as the power switch is turned ON by depressing only one of the function buttons F1 through F5, if only the specific measuring mode is allocated to a corresponding one of the function buttons F1 through F5 before the power switch is turned OFF.

In the above embodiment of the total station TS, the aforementioned presetting program (operation) shown as a subroutine in FIG. 9 is performed in the case that the illumination light ON/OFF switch button 13 is consecutively depressed twice in a row within two seconds, as noted before (operations at steps S006 through S012). Instead of such a manner, the presetting program shown as a subroutine in FIG. 9 may be performed in a different manner. For instance, a command to perform the presetting program may be registered in the data table for each of all the plurality of measuring modes in advance. In this case, no matter which measuring mode may have been set at present, the presetting program shown in FIG. 9 will be performed when one of the function buttons F1 through F5, which corresponds to the aforementioned registered command, is depressed.

In the above embodiment, each operational button 17 is a push button type of switch. However, each operational button 17 may be replaced by a sliding switch, a touch-sensor type of switch, or other type of switch. Furthermore, instead of using the operational buttons 17 or such a switch, a plurality of sections which respectively correspond to the operational buttons 17 may be formed to be indicated on a single indication panel, so that one of the plurality of sections is manually pointed by using a pointer such as a mouse to actuate the pointed section.

The EEPROM 21 may be replaced by a different type of storing device. In this case, it is preferable that the EEPROM 21 be replaced by a flash memory, a hard disk, a floppy disk or the like whose storing data is maintained even without power being supplied thereto. However, the EEPROM 21 may be replaced by a RAM. In this case, it is necessary to supply power to the RAM at all times to maintain the storing data therein.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electronic measuring apparatus having a plurality of measuring modes, each one of said plurality of measuring modes being selectively set to perform a corresponding operation, said electronic measuring apparatus comprising:

a plurality of operational buttons;

an operation button provided separately from said plurality of operational buttons;

means for storing information which associates one of said plurality of operational buttons with one of said plurality of measuring modes;

means for distinguishing which one of said plurality of operational buttons has been operated;

means for searching information, stored in said storing means, which associates said distinguished one of said plurality of operational buttons with said one of said plurality of measuring modes and for performing an operation unique to said one of said plurality of measuring modes which is associated with said distinguished one of said plurality of operational buttons;

means for supplying electrical power to said searching and performing means, wherein said supplying means starts supplying said electrical power to said searching and performing means when said distinguishing means distinguishes said one of said plurality of operational buttons, and further wherein said searching and performing means starts performing said operation upon receiving said electrical power from said supplying means; and means for renewing said stored information in said storing means when said operation button, provided separately from said plurality of operational buttons, is operated.

2. The electronic measuring apparatus according to claim 1, wherein said distinguishing means comprises means for monitoring each of said plurality of operational buttons to detect if there is a change in condition in said plurality of operational buttons, and wherein said supplying means supplies said electrical power when said monitoring means detects said change in condition in said plurality of operational buttons.

3. The electronic measuring apparatus according to claim 1, wherein said storing means comprises an EEPROM.

4. The electronic measuring apparatus according to claim 1, wherein said storing means comprises a flash memory.

5. The electronic measuring apparatus according to claim 1, wherein said storing means comprises a disc on which said stored information is recorded.

6. The electronic measuring apparatus according to claim 1, wherein said storing means comprises a RAM and a back-up power source for supplying electrical power to said RAM.

7. The electronic measuring apparatus according to claim 1, further comprising means for visually indicating an indication unique to one of said plurality of measuring modes which is presently set.

8. The electronic measuring apparatus according to claim 7, wherein said indication means comprises an LCD panel.

9. The electronic measuring apparatus according to claim 1, wherein said renewing means renews said information stored in said storing means by storing that information in said storing means which associates one of said plurality of measuring modes which is to be set immediately after the supplying means starts supplying said electrical power with said distinguished one of said plurality of operational buttons.

10. The electronic measuring apparatus according to claim 1, wherein said renewing means renews said information stored in said storing means by storing that information in said storing means which associates one of said plurality of measuring modes which is to be set immediately after said supplying means starts supplying said electrical power with said distinguished one of said plurality of operational buttons.

11. An electronic measuring apparatus having a plurality of measuring modes, each one of said plurality of measuring modes being selectively set to perform a corresponding operation, said electronic measuring apparatus comprising:

a plurality of operational buttons;

means for distinguishing which one of said plurality of operational buttons has been operated;

means for setting a current measuring mode from one of said plurality of measuring modes and for performing an operation unique to said current measuring mode;

means for supplying electrical power to said setting and performing means, wherein said supplying means starts supplying said electrical power to said setting and performing means when said distinguishing means distinguishes said one of said plurality of operational buttons, and further wherein said setting and performing means starts performing said operation upon receiving said electrical power from said supplying means;

means for visually indicating an indication which shows a relationship between at least one of said plurality of operational buttons in one of said plurality of measuring modes which has been set by said setting means, and another one of said plurality of measuring modes;

means for storing information which associates one of said plurality of operational buttons with one of said plurality of measuring modes;

measuring mode setting means for firstly searching said stored information in said storing means and subsequently for controlling said setting and performing means to set said current measuring mode, immediately after said setting and performing means starts performing said operation, and thereafter, for controlling said setting and performing means to set a second one of said plurality of measuring modes when one of said plurality of buttons, which is associated with said second one of said plurality of measuring modes by said information visually indicated by said indicating means, is operated;

means for renewing said stored information in said storing means; and an operation button, provided separately from said plurality of operational buttons, wherein said renewing means is actuated when said operation button is operated.

12. The electronic measuring apparatus according to claim 11, wherein said distinguishing means comprises means for monitoring each of said plurality of operational buttons to detect if there is a change in condition in said plurality of operational buttons, and wherein said supplying means supplies said electrical power when said monitoring means detects said change in condition in said plurality of operational buttons.

13. The electronic measuring apparatus according to claim 11, wherein said storing means comprises an EEPROM.

14. The electronic measuring apparatus according to claim 11, wherein said storing means comprises a flash memory.

15. The electronic measuring apparatus according to claim 11, wherein said storing means comprises a disc on which said stored information is recorded.

16. The electronic measuring apparatus according to claim 11, wherein said storing means comprises a RAM and a back-up power source for supplying electrical power to said RAM.

17. The electronic measuring apparatus according to claim 11, wherein said indication means comprises an LCD panel.

18. The electronic measuring apparatus according to claim 11, wherein said renewing means renews said information stored in said storing means by storing information in said storing means which associates one of said plurality of measuring modes which is to be set immediately after said supplying means starts supplying said electrical power with said distinguished one of said plurality of operational buttons.

19. The electronic measuring apparatus according to claim 11, wherein said renewing means renews said information stored in said storing means by storing information in said storing means which associates one of said plurality of measuring modes which is to be set immediately after said supplying means starts supplying said electrical power with said distinguished one of said plurality of operational buttons.

20. An electronic measuring apparatus having a plurality of measuring modes, each one of said plurality of measuring modes being selectively set to perform a corresponding operation, said electronic measuring apparatus comprising:

a plurality of operational buttons;

means for distinguishing which one of said plurality of operational buttons has been operated;

means for setting a current measuring mode from one of said plurality of measuring modes and for performing an operation unique to said current measuring mode;

means for supplying electrical power to said setting and performing means, wherein said supplying means starts supplying said electrical power to said setting and performing means when said distinguishing means distinguishes said one of said plurality of operational buttons, and further wherein said setting and performing means starts performing said operation upon receiving said electrical power from said supplying means;

means for visually selectively indicating each one of a plurality of indications each showing a relationship between at least one of said plurality of operational buttons in one of said plurality of measuring modes which has been set by said setting means, and a command to change a presently-indicated one of said plurality of indications to another one of said plurality of indications;

means for storing information which associates one of said plurality of operational buttons with one of said plurality of indications;

an indication controller that examines said information stored in said storing means and subsequently controls said indicating means to indicate said one of said plurality of indications, immediately after said setting and performing means starts performing said operation, and thereafter, controls said indicating means to indicate a second one of said plurality of indications when one of said plurality of buttons associated with said changing command is operated;

means for renewing said stored information in said storing means; and an operation button, provided separately from said plurality of operational buttons, wherein said renewing means is actuated when said operation button is operated.

21. The electronic measuring apparatus according to claim 20, wherein said distinguishing means comprises means for monitoring each of said plurality of operational buttons to detect if there is a change in condition in said plurality of operational buttons, and wherein said supplying means supplies said electrical power when said monitoring means detects said change in condition in said plurality of operational buttons.

22. The electronic measuring apparatus according to claim 20, wherein said stored information stored in said storing means comprises first information which associates one of said plurality of operational buttons with one of said plurality of measuring modes, and second information which associates each one of said plurality of measuring modes with a corresponding one of said plurality of indications.

23. The electronic measuring apparatus according to claim 22, wherein said storing means comprises an EEPROM for storing said first information.

24. The electronic measuring apparatus according to claim 22, wherein said storing means comprises a flash memory for storing said first information.

25. The electronic measuring apparatus according to claim 22, wherein said storing means comprises a disc on which said first information is recorded.

26. The electronic measuring apparatus according to claim 22, wherein said storing means comprises a RAM for storing said first information, and a back-up power source for supplying electrical power to said RAM.

27. The electronic measuring apparatus according to claim 20, wherein said indication means comprises an LCD panel.

28. The electronic measuring apparatus according to claim 20, wherein said renewing means renews said information stored in said storing means by storing that information in said storing means which associates one of said plurality of indications which is to be indicated immediately after the supplying means starts supplying said electrical power with said distinguished one of said plurality of operational buttons.

29. The electronic measuring apparatus according to claim 20, wherein said renewing means renews said information stored in said storing means by storing said information in said storing means which associates one of said plurality of indications which is to be indicated immediately after said supplying means starts supplying said electrical power with said distinguished one of said plurality of operational buttons.

30. An electronic measuring apparatus having a plurality of programs, each one of said plurality of programs being selectively performed to carry out a corresponding operation, said electronic measuring apparatus comprising:

a medium in which said plurality of programs are stored;

a plurality of operational buttons, at least one of said plurality of operational buttons associating with a corresponding one of said plurality of programs;

means for distinguishing which one of said plurality of operational buttons has been operated;

means for performing a program unique to that one of said plurality of programs which corresponds to said distinguished one of said plurality of operational buttons;

means for supplying electrical power to said performing means, wherein said supplying means starts supplying said electrical power to said performing means when said distinguishing means distinguishes said one of said plurality of operational buttons; and means for renewing said program when said an operation button, provided separately from said plurality of operational buttons, is operated, wherein said performing means starts performing said operation upon receiving said electrical power from said supplying means.

31. The electronic measuring apparatus according to claim 30, wherein said distinguishing means comprises means for monitoring each of said plurality of operational buttons to detect if there is a change in condition in said plurality of operational buttons, and wherein said supplying means supplies said electrical power when said monitoring means detects said change in condition in said plurality of operational buttons.

32. An electronic measuring apparatus having a plurality of measuring modes, each measuring mode of said plurality of measuring modes being selectively set to perform a corresponding operation, said electronic measuring apparatus comprising:

a plurality of manually actuable operation buttons;

a memory that stores at least one measuring mode of said plurality of measuring modes;

a pre-setting device that initially allocates one operation button of said plurality of manually actuable operation buttons to a corresponding button for one measuring mode of said plurality of measuring modes stored in said memory;

a detector that detects a manual actuation of said button selected by said pre-setting device;

an initiator that supplies electrical power to said electronic measuring apparatus; and a controller that coordinates said memory, said pre-setting device, said detector and said initiator, such that when a manual actuation of said button is detected by said detector, electrical power is supplied to said electronic measuring device and concurrently rendered operable with said measuring mode corresponding to said button.

33. An electronic measuring apparatus having a plurality of measuring modes, each measuring mode of said plurality of measuring modes being selectively set to perform a corresponding operation, said electronic measuring apparatus comprising:

a plurality of manually actuable operation buttons;

a memory that stores at least one measuring mode of said plurality of measuring modes;

a selector that selects at least one at least one operation button of said plurality of manually actuable operation buttons as a corresponding button for said at least one measuring mode of said plurality of measuring modes stored in said memory;

a detector that detects a manual actuation of said button selected by said selector;

an initiator that supplies electrical power to said electronic measuring apparatus; and a manual switch arranged to perform at least one predetermined operation of said electronic measuring device, wherein, when a predetermined sequence of operation of said manual switch is performed, a measuring mode which is made operable when electrical power is supplied to said electronic measuring apparatus by said initiator, can be assigned to any one of said operational buttons.

34. The electronic measuring apparatus of claim 33, wherein said manual switch comprises an illumination ON/OFF switch, said predetermined sequence of operations comprising an operation of changing a state of said illumination ON/OFF switch a predetermined number of times with a predetermined period of time.

35. The electronic measuring device of claim 34, wherein said predetermined number of times comprises two.

36. The electronic measuring device of claim 34, wherein said predetermined period of time comprises two seconds.

37. The electronic measuring device of claim 35, wherein said predetermined period of time comprises two seconds.

* * * * *